United States Patent [19]
Smith

[11] Patent Number: 5,890,735
[45] Date of Patent: Apr. 6, 1999

[54] HYBRID INFLATOR WITH DIFFUSER END TRANSLATING INITIATOR BOSS

[75] Inventor: Bradley W. Smith, Ogden, Utah

[73] Assignee: Morton International Inc., Chicago, Ill.

[21] Appl. No.: 782,815

[22] Filed: Jan. 13, 1997

[51] Int. Cl.⁶ ................................................. B60R 21/26
[52] U.S. Cl. .......................... 280/737; 222/3; 280/741; 102/531
[58] Field of Search .................................... 102/530, 531; 280/736, 737, 740, 741, 742; 222/3

[56] References Cited

U.S. PATENT DOCUMENTS

| | | | |
|---|---|---|---|
| 3,786,843 | 1/1974 | Stephenson et al. | 141/13 |
| 3,868,124 | 2/1975 | Johnson | 280/150 AB |
| 3,869,143 | 3/1975 | Merrell | 280/150 AB |
| 3,901,530 | 8/1975 | Radke | 280/150 AB |
| 3,966,228 | 6/1976 | Neuman | 280/737 |
| 3,968,980 | 7/1976 | Hay | 280/734 |
| 5,016,914 | 5/1991 | Faigle et al. | 280/741 |
| 5,060,974 | 10/1991 | Hamilton et al. | 280/736 |
| 5,131,680 | 7/1992 | Coultas et al. | 280/737 |
| 5,184,846 | 2/1993 | Goetz | 280/736 |
| 5,344,186 | 9/1994 | Bergerson et al. | 280/741 |
| 5,348,344 | 9/1994 | Blumenthal et al. | 280/737 |
| 5,350,192 | 9/1994 | Blumenthal | 280/737 |
| 5,378,018 | 1/1995 | Ketterer et al. | 280/737 |
| 5,513,572 | 5/1996 | Frantom et al. | 102/531 |
| 5,577,769 | 11/1996 | Di Giacomo et al. | 280/737 |
| 5,584,504 | 12/1996 | Cuevas et al. | 102/531 |
| 5,603,525 | 2/1997 | Zakula | 280/737 |
| 5,664,803 | 9/1997 | Skanberg et al. | 280/741 |

*Primary Examiner*—Harold J. Tudor
*Attorney, Agent, or Firm*—George W. Rauchfuss, Jr.

[57] ABSTRACT

An inflator for a safety restraint system includes a gas storage vessel having a mouth, and a diffuser extending outwardly from the mouth and defining gas outlet ports. A combustion chamber having a flared open end is secured to the gas storage vessel peripherally adjacent the mouth and defines throttle orifices for releasing inflation gas from the gas storage vessel. A breakaway closure member is secured across the mouth of the gas storage vessel and the open end of the combustion chamber housing, the breakaway closure member including a periphery ring, a translating boss having an initiator mounted therethrough and a skirt slidingly received in the open end of the combustion chamber housing, and a frangible web connecting the boss to the periphery ring. The combustion chamber housing further defines exhaust ports opening to the gas storage vessel, and contains combustible material, which may be pyrotechnic gas generator or fluid fuel. The initiator ignites the combustible material and the resultant increased pressure in the combustion chamber housing fractures the frangible web and drives the translating boss into the diffuser to release gas from the gas storage vessel through the throttle orifices and diffuser. Hot products of combustion are delivered through the combustion chamber exhaust ports to heat and augment the pressure of the gas.

27 Claims, 5 Drawing Sheets

5,890,735

HYBRID INFLATOR WITH DIFFUSER END TRANSLATING INITIATOR BOSS

FIELD OF INVENTION

The invention herein relates to a hybrid inflator for inflatable safety restraint systems in vehicles and more particularly relates to a hybrid inflator having a translating initiator boss at the diffuser end thereof for opening both a gas storage chamber and a combustion chamber for combustible material augmenting the stored gas.

BACKGROUND OF INVENTION

Inflatable safety restraint systems are incorporated into automobiles and other vehicles to protect occupants in the event of a crash. An inflatable safety restraint system includes an airbag module incorporating an inflator and an airbag cushion, wherein the inflator provides inflation gas for inflating and deploying the airbag cushion.

Hybrid inflators provide the inflation gasses from a combination of stored pressurized gas and combustible material which is ignited to heat and expand the stored pressurized gas, and which may provide additional inflation gas as a product of combustion. The combustible material is often a pyrotechnic but may also be a liquid fuel. The products of combustion are delivered to the stored gas chamber to heat and expand the stored gas therein. It is further typical that the combustion chamber for the combustible material be located within the stored gas chamber, in order to provide heat transfer to the stored gas and further provide a relatively compact structure. Passenger side inflators often have an elongated tubular housing and a common variant has the combustible material at the closed end thereof with an initiator means mounted through the closed end and inflation gasses delivered from the open end of the elongated housing. Prior to operation of the inflator, the open end is sealed by a rupturable diaphragm, and the rupturable diaphragm is opened by internal pressure created when the combustible material is ignited. Alternatively, a mechanical linkage can be provided to puncture the seal. In inflators which are opened by increased internal pressure within the gas storage chamber, the need to develop high internal pressures necessary to release inflation gasses dictate a substantial housing. This increases the weight and cost of the inflator. The alternative of opening the inflator by mechanical linkage also requires additional cost and weight of the mechanical components.

The same considerations apply to a driver's side inflator, in which the combustible material is generally provided in a center tie surrounded by a toroidal gas storage chamber, with the gas being delivered through a burst disk or frangible portion of the housing on the end of the center tie facing the airbag cushion.

For efficient heating of the stored gas, it is also beneficial to have the combustion chamber and the outlets therefrom in the path of inflation gasses exiting the inflator, i.e., near the outlet burst disk. Such an inflator is shown in U.S. Pat. No. 5,131,680, wherein a projectile is fired through the burst disk to initiate a primer for igniting a combustible material contained in a combustion chamber near the outlet end of the inflator. Such prior art hybrid inflators require a substantial number of precision parts to function in their intended manner, thereby increasing the difficulty of manufacture and attendant cost.

All of these structures are somewhat more heavy, more complex and more expensive to manufacture than is desirable and, accordingly, there is a need for an improved hybrid inflator.

SUMMARY OF THE INVENTION

Accordingly, it is a principal object of the invention herein to provide an improved hybrid inflator for inflatable restraint systems.

It is an additional object of the invention herein to provide an improved hybrid inflator which releases inflation gas without developing high internal pressures of the stored gas in order to rupture a burst disk, frangible diaphragm, or the like It is another object of the invention herein to provide a hybrid inflator which releases stored gas without requiring a mechanical linkage, projectile, or the like to release the stored gas.

It is a further object of the invention herein to provide a hybrid inflator with the combustion chamber and outlets therefrom positioned for efficient heating of stored gas.

It is yet another object of the invention herein to provide a hybrid inflator which is reliable in operation and efficient in manufacture.

In carrying out the foregoing and other objects of the invention, there is provided a hybrid inflator having a gas storage vessel defining a mouth. A diffuser surrounds and extends outwardly from the mouth of the gas storage vessel. A combustion chamber housing has an open end secured to the gas storage vessel peripherally adjacent the mouth, and the combustion chamber housing defines a plurality of outlet orifices adjacent its open end for releasing inflation gasses from the gas storage vessel, and further defines a plurality of combustion chamber exhaust ports communicating from the combustion chamber to the gas storage vessel. A breakaway closure member is sealingly secured across the mouth of the gas storage vessel and the open end of the combustion chamber housing. The breakaway closure member includes a periphery ring sealingly secured to the gas storage vessel, a translating boss having a headwall extending across the mouth of the gas storage vessel and the end of the combustion chamber housing and having an initiator mounted therethrough, and having a skirt slidingly received in the open end of the combustion chamber housing. A frangible web connects the translating boss to the periphery ring, wherein upon fracture of the frangible web, the translating boss translates into the diffuser to expose the outlet orifices and mouth of the gas storage vessel with the skirt maintaining the combustion chamber housing substantially closed except for the combustion chamber exhaust ports. The gas storage vessel contains a pressurized gas and the combustion chamber housing contains a combustible material. Operation of the initiator ignites the combustible material in the combustion chamber housing and the resultant increased pressure in the combustion chamber housing fractures the frangible web and drives the translating boss into the diffuser to release stored gas from the gas storage vessel. The hot products of combustion of the combustible material are delivered to the gas storage vessel through the combustion chamber exhaust ports to heat and augment pressure of the gas stored therein, thereby increasing the flow of inflation gasses from the inflator.

According to additional aspects of the invention herein, the skirt of the translating boss blocks the exhaust ports of the combustion chamber housing prior to translation of the translating boss. Additionally, the end of the skirt is frangibly connected to the combustion chamber housing below the exhaust ports, to provide a sealed combustion chamber for containing fluid fuel, the frangible connection giving way together with the frangible web to permit translation of the boss.

Accordingly to further aspects of the invention herein, the combustion chamber is filled with a fluid fuel ignited by the initiator. The combustion chamber housing also contains a sub-housing providing separate storage of fluid fuel and an oxidizer. Alternatively, the combustion chamber contains a pyrotechnic gas generant and, additionally, contains an ignitor material for igniting the pyrotechnic gas generant. The pyrotechnic gas generant and the ignitor material are, in some embodiments, provided with a thin diaphragm seal on a perforate screen to position and separate them.

According to other aspects of the invention, the gas storage vessel is elongated and the combustion chamber housing extends into the gas storage vessel. Further, the elongated gas storage vessel has, in some embodiments, a small diameter neck to which the combustion chamber housing is secured.

According to still additional aspects of the invention, the diffuser has a radially inwardly extending top wall which limits translation of the translating boss. A shock absorbing pad and seal is provided for receiving the translating boss. A portion of the upper wall of the diffuser is open for connecting electrical leads to the initiator.

Other objects and features of the invention herein will in part be readily understood by those skilled in the art and will in part appear in the following description of the preferred embodiments and the claims, taken together with the drawings.

DRAWINGS

The same reference numerals refer to the same elements throughout the various Figures.

DESCRIPTION OF PREFERRED EMBODIMENTS

Figure 1:
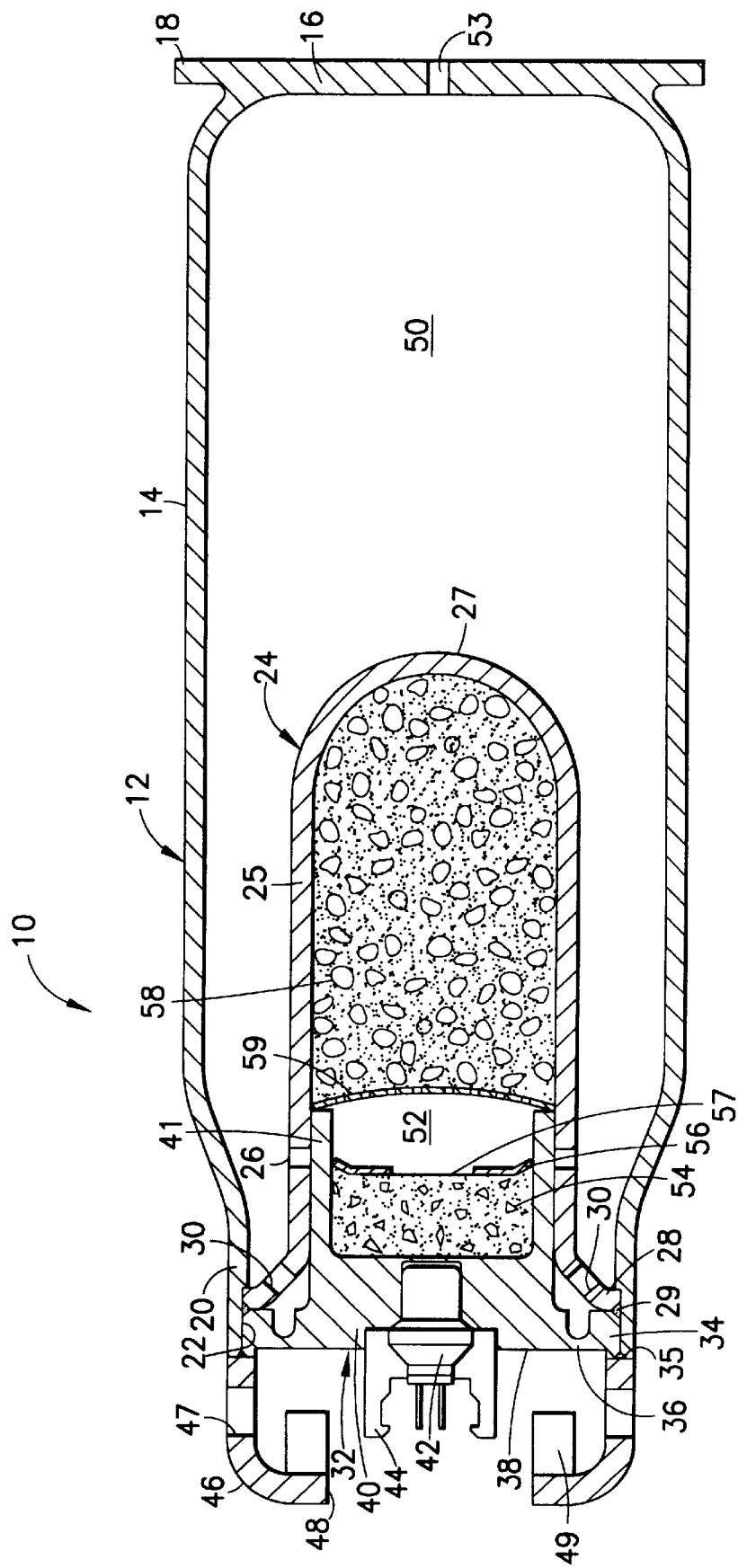
FIG. 1 is a longitudinal sectional view of an inflator according to the invention herein incorporating stored pressurized gas and a pyrotechnic gas generant.
Figure 2:
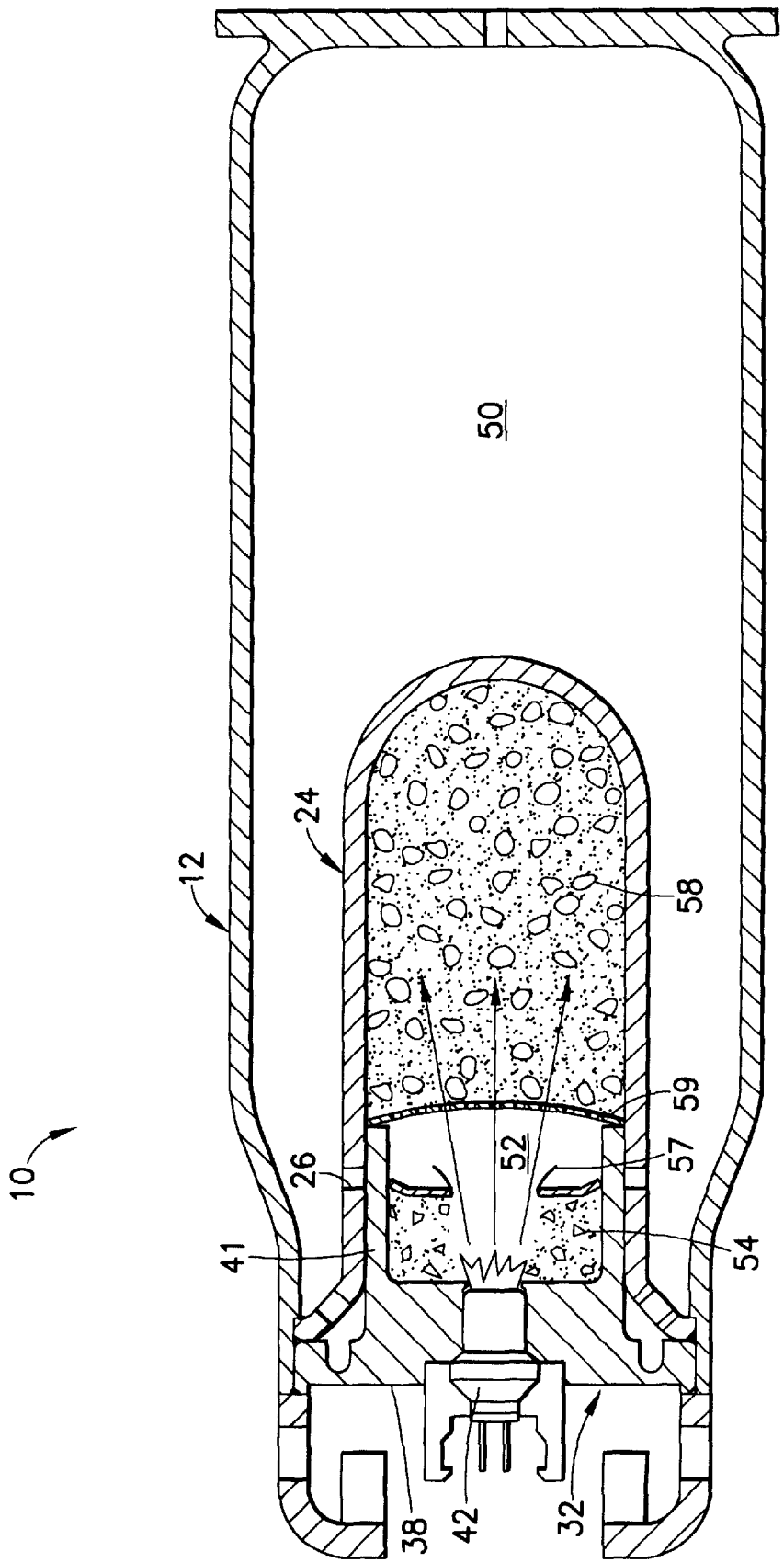
FIG. 2 is a longitudinal sectional view of the inflator of FIG. 1, during the ignition sequence.
Figure 3:
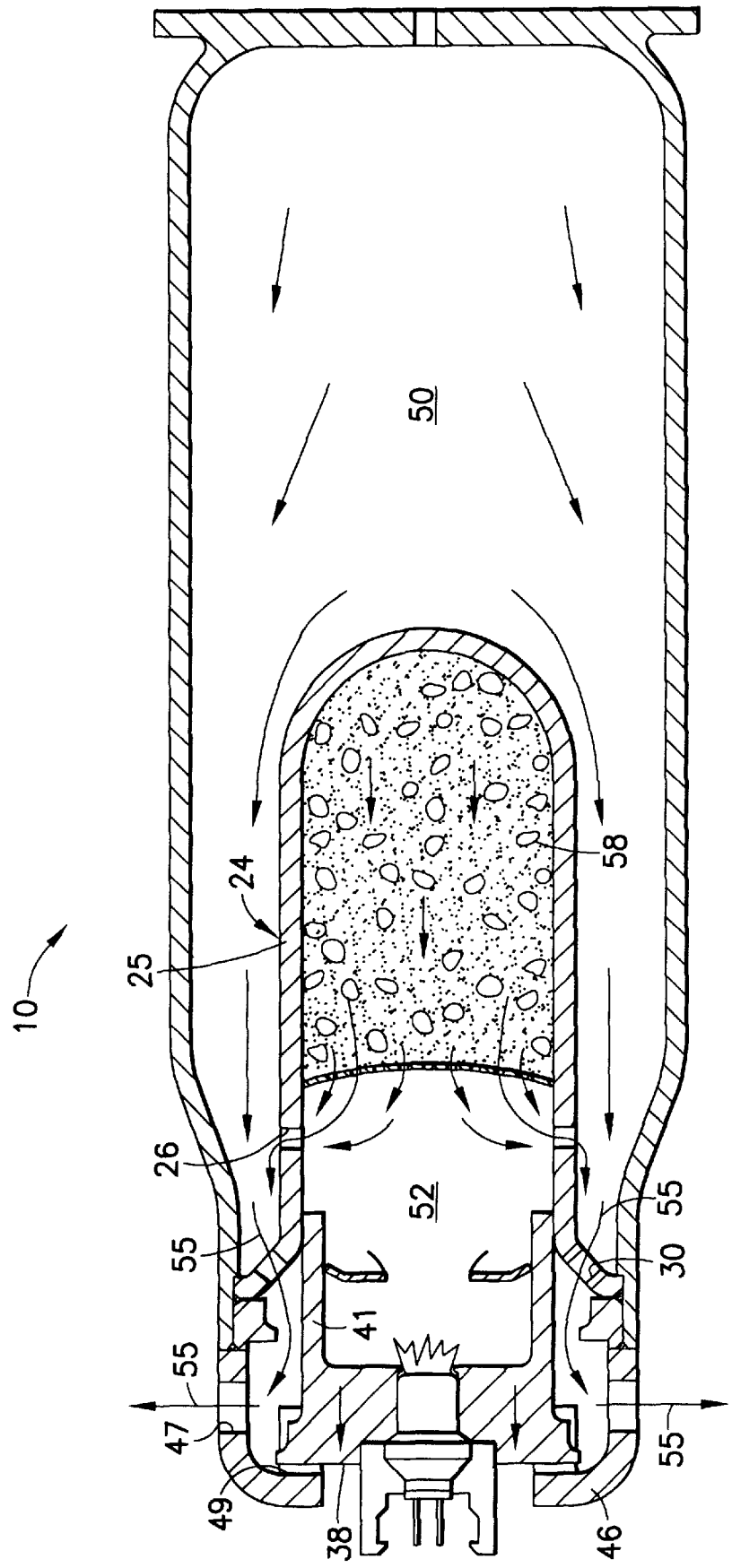
FIG. 3 is a longitudinal sectional view of the inflator of FIG. 1, during the,gas delivery sequence.

The invention herein relates to inflators having a translating initiator boss at a diffuser end, and an inflator 10 according to the invention herein is illustrated in FIGS. 1–3. Also illustrated in the drawings are an inflator 60 in FIGS. 4–6, and an inflator 100 in FIG. 7, both of which also have a translating initiator boss, as more fully described below.

The inflator 10 of FIGS. 1–3 is configured for use in a passenger side safety restraint system, and has an elongated gas storage vessel 12 with a tubular sidewall 14, a closed end 16 including a mounting flange 18. The tubular sidewall 14 has a reduced diameter neck 20 and an open mouth 22. A combustion chamber housing 24 is mounted within the gas storage vessel 12, and includes a tubular body 25 and a hemispheric closed end 27. At the other end of the tubular body is a flared end 28, which is secured to the neck 20 of the gas storage vessel adjacent the mouth 22 by welding, as indicated at 29. The tubular body 24 defines a plurality of exhaust ports 26 mediate the ends, and the flared end 28 of the combustion chamber housing defines a plurality of outlet orifices 30 which, when the inflator 10 is operated, control or "throttle" the release of inflation gasses.

A breakaway closure member 32 is mounted at the mouth 22 of the gas storage vessel 12. The breakaway closure member 32 includes a periphery ring 34 which is secured to the mouth 22 of the gas storage vessel 12 by weld 35. A frangible web 36 connects the periphery ring 34 with a translating initiator boss 38 including a headwall 40 and a skirt 41 extending from the headwall 40 and slidingly received within the tubular body 25 of the combustion chamber housing to cover the exhaust ports 26. The headwall 40 defines an opening mounting an initiator 42, commonly known as a squib, and a retainer 44 is provided for securing the initiator 42 in the headwall and also providing a plug receptacle for a plug connector and electrical leads, not shown, to the initiator.

A cup-shaped diffuser 46 is secured to and extends from the neck 20 of the gas storage vessel, the diffuser having a plurality of radially disposed outlet openings 47 for delivery of inflation gasses. The diffuser has a central opening 48, which permits and provides access for connection of the plug connector and electrical to the initiator 42. The diffuser further includes a shock absorbing pad and seal 49 surrounding the opening 48.

The breakaway closure member 32, including the translating initiator boss 38 and its skirt 41, thereby close the mouth 22 of the gas storage vessel 12 to provide a gas storage chamber 50 therein, and also close the combustion chamber housing 24 to provide a closed combustion chamber 52 therein.

A fill port 53 is provided for introducing gas into the gas storage chamber 50. The gas is preferably argon or nitrogen, at a pressure of approximately 2,000–4,000 pounds per square inch. The combustion chamber 52 is provided with ignition material 54, secured in position adjacent the initiator 42 by a bracket 56 and seal 57. The tubular body and closed end of the combustion chamber housing is packed with a pyrotechnic gas generant 58, secured in position by a perforated diaphragm 59 so that the pyrotechnic gas generant does not rattle around and degrade prior to operation of the inflator 10. The ignition material and pyrotechnic gas generant may be selected from any of those well-known in the art, and no particular ones are preferable or critical to the invention.

FIG. 2 illustrates the inflator 10 during the ignition sequence. The initiator 42 has fired, thereby igniting the ignitor material 54, which blows through the seal 57 and the retainer screen 59 to ignite the pyrotechnic gas generant 58. At this point the exhaust ports 26 of the combustion chamber housing 24 are blocked by the skirt 41 of the translating initiator boss 38 wherein the combustion and resulting pressure of the burning of the ignitor material and pyrotechnic gas generant is confined to the combustion chamber 52.

With reference to FIG. 3, the inflator 10 is illustrated in the inflation gas dispensing sequence. The pressure developed within the combustion chamber 52, illustrated and discussed with respect to FIG. 2 above, has ruptured the frangible web 36 wherein the translating initiator boss 38 translates into the diffuser 46, coming to rest against the shock absorbing pad and seal 49. This creates a path indicated by arrow 55, from the pressure chamber 50 through the throttle orifices 30, through the mouth 22 of the gas storage vessel 12, and out the gas outlet openings 47 of the diffuser 46.

When the initiator boss 38 translates into the diffuser 46, the skirt 41 uncovers the exhaust ports 26 in the tubular body 25 of the combustion chamber housing 24, permitting products of combustion from the pyrotechnic gas generant 58 to mix with and heat the pressurized gas exiting the gas storage chamber 50. It should be noted that the skirt 41 remains positioned partially within the tubular body 25 of the combustion chamber housing 24, wherein the initiator boss continues to define the closed combustion chamber 52 such that all the products of combustion are supplied through the exhaust ports 26. It should also be noted that the combustion chamber housing 24 and the translating initiator boss 38 themselves become quite hot from the combustion occurring within, and transfer heat to the gas within the gas storage chamber 50, particularly as the gas flows through the neck of the gas storage vessel and exits the diffuser 46. Thus, the gas in the gas storage chamber 50 is delivered as inflation gas from the diffuser, augmented by the heat and products of combustion of the ignitor material 54 and pyrotechnic gas generant 58.

The pressure required to rupture the frangible web 36 and translate the initiator boss 38 is developed entirely within the combustion chamber 52. Further, the translating initiator boss 38 opens the gas delivery flow path 55 through the throttle orifices 30 and gas outlet openings 47 of the diffuser prior to or nearly simultaneously with exposing the exhaust ports 26 of the combustion chamber 52. Thus, the ignition sequence and gas dispensing sequence of the inflator 10 does not result in substantially increased pressure within the gas storage chamber 50 and the gas storage vessel can accordingly be designed as a relatively lightweight structure. Also, the onset of inflation is "soft" in that there is no buildup of pressure within the gas storage vessel which is suddenly released into an airbag cushion upon rupture of an outlet burst disk or the like. Construction of the gas storage vessel is also simplified by having the initiator mounted directly with the combustion chamber housing, but yet exposed to the exterior of the inflator for connecting leads to trigger the operational sequence.

Figure 4:
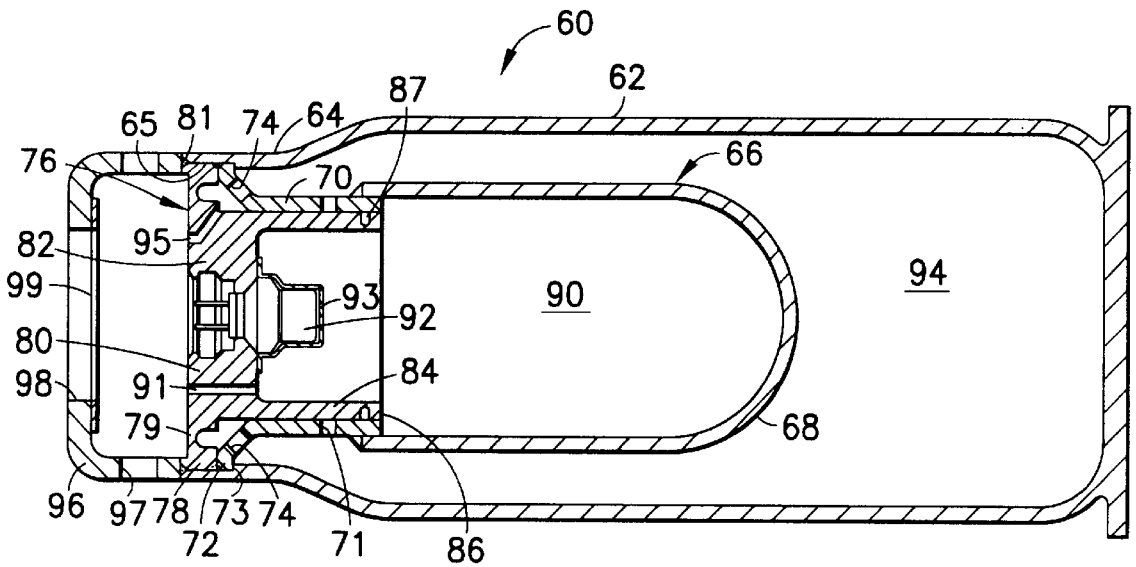
FIG. 4 is a longitudinal sectional view of an inflator according to the invention herein, incorporating stored pressurized gas and a combustible fluid fuel.
Figure 5:
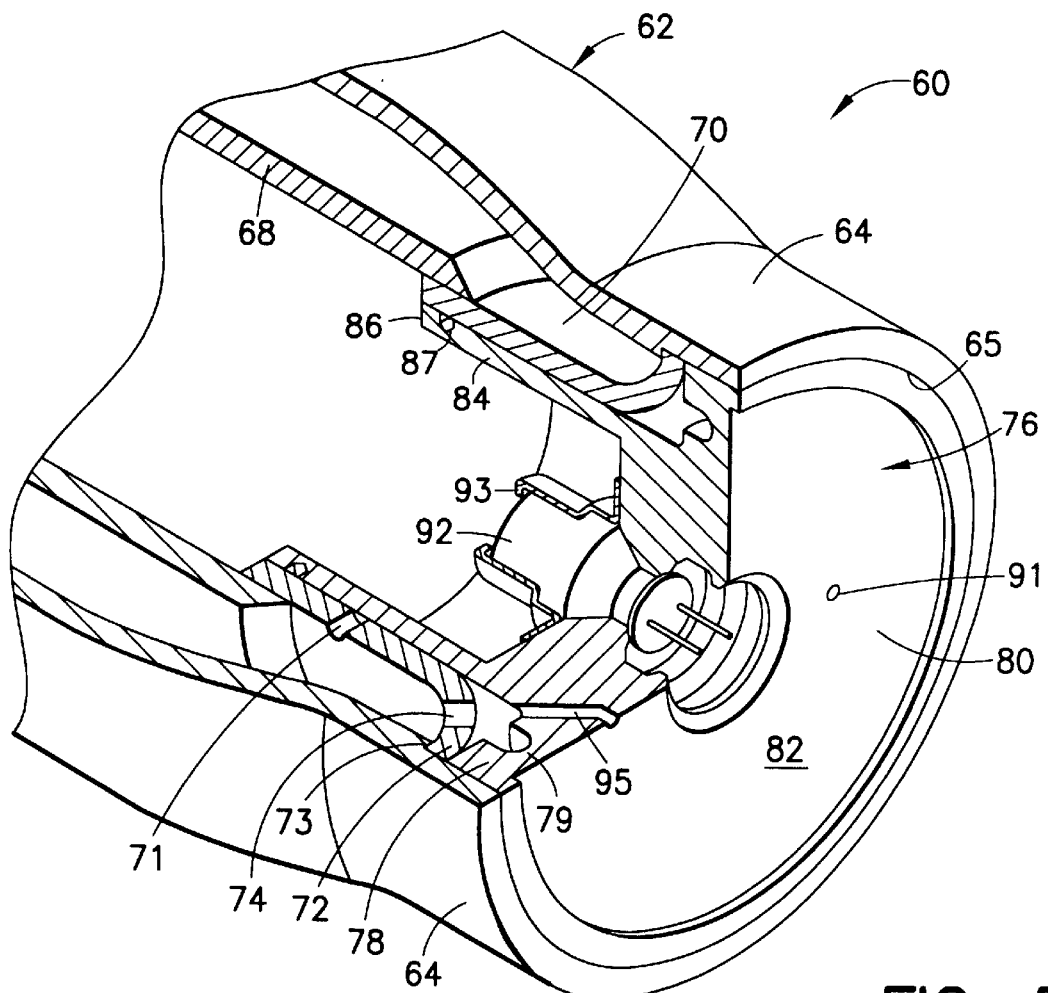
FIG. 5 is a perspective view, partially cut away, of the end of the inflator of FIG. 4.
Figure 6:
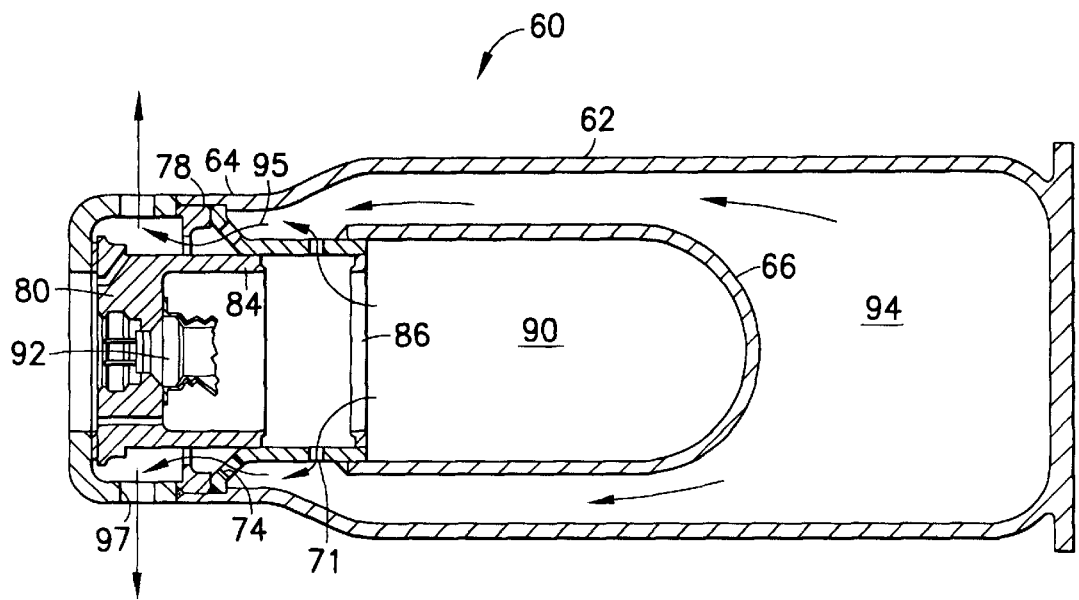
FIG. 6 is a longitudinal sectional view of the inflator of FIG. 4, during the gas delivery sequence.

With reference to FIGS. 4–6, another inflator 60 according to the invention herein is illustrated. The inflator 60 is similar to the inflator 10, except it is adapted to utilize a fluid fuel in a combustion chamber housing 66 rather than an ignitor material and pyrotechnic gas generator, as described above with respect to inflator 10.

Accordingly, the inflator 60 comprises a gas storage vessel 62 having a neck 64 and a mouth 65. A combustion chamber housing 66 is deployed within the gas storage vessel 62. The combustion chamber housing 66 comprises an elongated tubular sidewall and end cap 68 secured to a skirt receiving sidewall 70 having a flared end 72 defining throttle orifices 74. A breakaway closure member 76 is secured at the open end of the gas storage vessel 62, extending across the mouth 65 thereof, and includes a periphery ring 78, a frangible web 79, and a translating initiator boss 80. The periphery ring 78 is welded to the gas storage vessel 62 at 81, and secures the flared end 72 against a step 73 provided in the neck 64, thereby mounting the combustion chamber housing 66 within the gas storage vessel 62. The initiator boss 80 has a headwall 82 and a skirt 84 slidingly received within the skirt-receiving sidewall 70 of the combustion chamber housing 66. A skirt end 86 is sealingly welded to the skirt sidewall 70, and the skirt has a frangible connector 87 permitting the skirt to separate from its skirt end 86. It will be appreciated that the combustion chamber housing 66 is made in its two parts 68 and 70 so that the skirt end 86 can be sealingly welded to the skirt sidewall 70, and that the tubular sidewall and end cap 68 is then attached to the skirt sidewall 70.

The structure described above provides a sealed combustion chamber 90, which is filled with a fluid fuel through fill port 91 in the headwall 82. The fluid fuel may be selected from those known in the art, and no particular one is preferred or critical to the invention. The headwall 82 further mounts an initiator 92 for igniting the fluid fuel and the initiator is covered by a seal 93 to prevent escape of the fluid fuel. The breakaway closure member 76 also sealingly closes the mouth 65 of the gas storage vessel 62 to define a gas storage chamber 94, which is filled with pressurized gas through a second fill port 95 in the headwall 82.

The inflator 60 further comprises diffuser 96 having gas outlet openings 97 and a central opening 98 for connecting leads to the initiator 92. A sealing pad 99 is secured over the central opening 98 after attachments of the leads.

With reference to FIG. 6, the inflator 60 is illustrated in its gas dispensing mode. The initiator 92 has fired to ignite the fluid fuel in the combustion chamber 90. The resulting increase in pressure has separated the skirt end 86 from the skirt 84 and has also fractured the frangible web 79 connecting the periphery ring 78 with the translating initiator boss 80, permitting the initiator boss to translate into the diffuser 96 and achieve the position illustrated in FIG. 6. This uncovered the throttle orifices 74 and opened a path indicated by arrow 95 from the gas storage chamber 94 through the throttle orifices 74 to the diffuser 96 and the diffuser gas outlet ports 97, for delivery of inflation gas. The skirt 84 of the initiator boss thereby uncovered the exhaust ports 71 in the combustion chamber housing 66, wherein the products of combustion of the fluid fuel are introduced into the gas storage chamber 94 for heating and augmenting the pressure of the delivered gas. Thus, the inflator 60 achieves the same benefits as the inflator 10 described above, in that the inflator is opened by pressure developed within the combustion chamber, and the gas delivery paths are opened before significant contribution to pressure from the combustion chamber by the combustible material in the combustion chamber 90, providing a softer onset to inflation of an airbag cushion.

Figure 7:
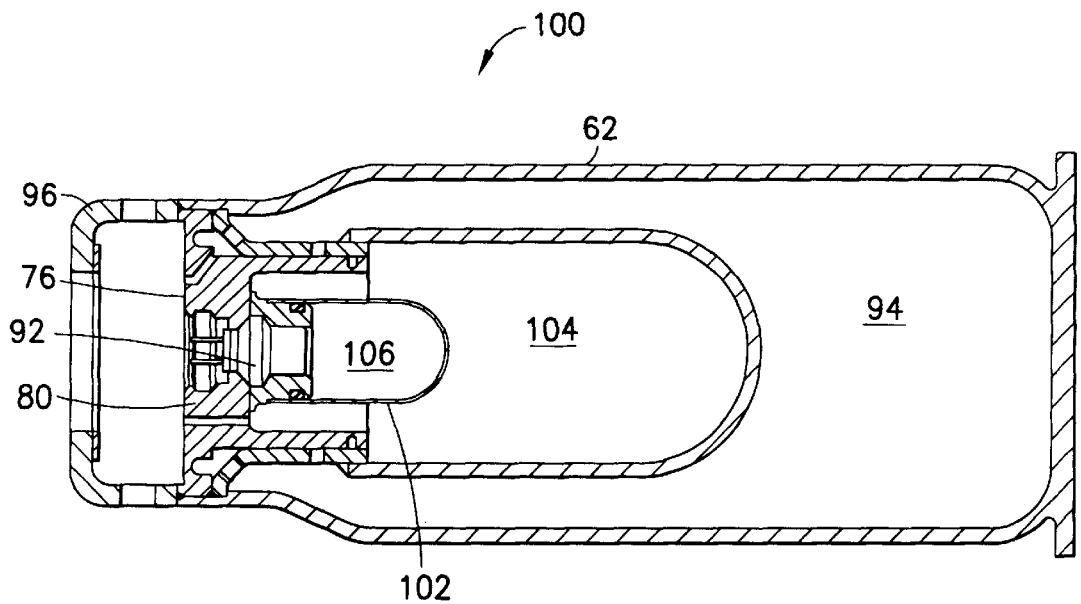
FIG. 7 is a longitudinal sectional view of another inflator according to the invention herein, incorporating stored pressurized gas, a liquid fuel and an oxidizer for the liquid fuel.

Another inflator 100 is illustrated in FIG. 7, and inflator 100 is similar in most respects to the inflator 60 illustrated in FIGS. 4–6. The inflator 100 is characterized by a secondary combustion chamber housing 102 surrounding the operative end of the initiator 92 and separating the combustion chamber into sub-chambers 104 and 106. This structure permits a fluid fuel and an oxidizer therefore to be kept separated prior to operation of the initiator 92. The inflator 100 operates in the same manner of the inflators 10 and 60 described above, with the initiator boss 80 translating into the diffuser 96 to open both the gas storage chamber 94 and the combustion chamber.

Accordingly, inflators have been described which fulfill the objects of the invention herein. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An inflator for a safety restraint system, the inflator comprising:
   A) a gas storage vessel having a mouth;
   B) a diffuser surrounding and extending outwardly from the mouth of the gas storage vessel and defining a plurality of gas outlet ports;
   C) a combustion chamber housing having an open end secured to the gas storage vessel peripherally adjacent the mouth thereof, the combustion chamber housing defining adjacent its open end a plurality of outlet orifices for releasing inflation gas from the gas storage vessel, the combustion chamber housing further defining exhaust ports opening to the interior of the gas storage vessel;
   D) a breakaway closure member sealingly secured across the mouth of the gas storage vessel to provide a closed gas storage chamber and across the open end of the combustion chamber housing to provide a combustion chamber, the breakaway closure member including
      i) a periphery ring,
      ii) a translating boss having an initiator mounted therethrough and a skirt slidingly received in the open end of the combustion chamber housing,
      iii) a frangible web connecting the translating boss to the periphery ring, wherein, upon fracture of the web, the translating boss translates into the diffuser to open the mouth of the gas storage vessel to provide a path from the outlet orifices through the diffuser outlet openings, with the skirt of the translating boss still received in the open end of the combustion chamber housing; and
   E) pressurized gas contained within the gas storage vessel and combustible material contained within the combustion chamber housing,
whereby operation of the initiator ignites the combustible material in the combustion chamber housing and the resultant increased pressure in the combustion chamber housing fractures the frangible web and drives the translating boss into the diffuser to release gas from the gas storage vessel through the outlet orifices and diffuser, and hot products of combustion of the combustion material are delivered through the combustion chamber exhaust ports to heat and augment the pressure of the gas.

2. An inflator as defined in claim 1 wherein the combustible material contained within the combustion chamber housing includes a pyrotechnic gas generant.

3. An inflator as defined in claim 2 wherein the combustible material contained within the combustion chamber housing includes ignitor material deployed adjacent the initiator.

4. An inflator as defined in claim 3 wherein the ignitor material is held deployed adjacent the initiator by a bracket and seal.

5. An initiator as defined in claim 4 wherein the pyrotechnic gas generant is secured within the combustion chamber by a perforate screen.

6. An inflator as defined in claim 5 wherein the skirt of the translating initiator boss blocks the exhaust ports of the combustion chamber housing and the exhaust ports are exposed upon translation of the translating initiator boss.

7. An inflator as defined in claim 1 wherein the skirt of the translating initiator boss blocks the exhaust ports of the combustion chamber housing and the exhaust ports are exposed upon translation of the translating initiator boss.

8. An inflator as defined in claim 7 wherein the skirt has a skirt end secured to the combustion chamber housing to seal the exhaust ports thereof.

9. An inflator as defined in claim 8 wherein the combustible material is a fluid fuel.

10. An inflator as defined in claim 9 wherein the combustion chamber is divided into two sub-chambers respectively containing the fluid fuel and an oxidizer for the fluid fuel.

11. An inflator as defined in claim 1 wherein the combustible material is a fluid fuel.

12. An inflator as defined in claim 11 wherein the combustible material is a fluid fuel and an oxidizer for the fluid fuel maintained in separate sealed portions of the combustion chamber.

13. An inflator as defined in claim 11 wherein the translating initiator boss defines a fill port for the stored gas.

14. An inflator as defined in claim 11 wherein the initiator boss defines the fill port for the fluid fuel.

15. An inflator as defined in claim 1 wherein the outlet orifices defined by a flared end of the combustion chamber housing are throttle orifices controlling the flow of inflation gasses from the gas storage chamber.

16. An inflator as defined in claim 15 wherein the diffuser outlet openings are radially disposed.

17. An inflator as defined in claim 15 wherein the diffuser receives and limits the extent of translation of the translating initiator boss.

18. An inflator as defined in claim 17 wherein the diffuser mounts a shock absorbing and sealing pad receiving the translating initiator boss.

19. An inflator as defined in claim 18 wherein the diffuser defines an opening providing access to the translating initiator boss for attaching electrical leads to the initiator mounted therethrough.

20. An inflator as defined in claim 1 wherein the diffuser receives and limits the extent of translation of the translating initiator boss.

21. An inflator as defined in claim 20 wherein the diffuser mounts a shock absorbing and sealing pad receiving the translating initiator boss.

22. An inflator as defined in claim 21 wherein the diffuser defines an opening providing access to the translating initiator boss for attaching electrical leads to the initiator mounted therethrough.

23. An inflator as defined in claim 1 wherein the translating initiator boss defines a fill port for the stored gas.

24. An inflator as defined in claim 1 wherein the combustion chamber housing has a flared open end defining the outlet orifices.

25. An inflator as defined in claim 24 wherein the outlet orifices throttle the flow of inflation gas from the gas storage vessel.

26. An inflator as defined in claim 1 wherein the gas storage vessel is elongated and extends to a closed end having mounting flange, adapting the inflator for use on the passenger side of a vehicle.

27. An inflator as defined in claim 26 wherein the gas storage vessel has a neck adjacent its mouth.

* * * * *